【19】 United States Patent
Akada et al.

(10) Patent No.: US 11,505,856 B2
(45) Date of Patent: Nov. 22, 2022

(54) COPPER-COATED STEEL WIRE AND STRANDED WIRE

(71) Applicant: Sumitomo Electric Industries, Ltd., Osaka (JP)

(72) Inventors: Takumi Akada, Osaka (JP); Shinei Takamura, Osaka (JP); Daigo Sato, Osaka (JP); Takaaki Enomoto, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/262,352

(22) PCT Filed: Aug. 7, 2018

(86) PCT No.: PCT/JP2018/029652
§ 371 (c)(1),
(2) Date: Jan. 22, 2021

(87) PCT Pub. No.: WO2020/031268
PCT Pub. Date: Feb. 13, 2020

(65) Prior Publication Data
US 2021/0164083 A1 Jun. 3, 2021

(51) Int. Cl.
*C22C 38/58* (2006.01)
*B32B 15/01* (2006.01)
(Continued)

(52) U.S. Cl.
CPC ............ *C22C 38/58* (2013.01); *B32B 15/015* (2013.01); *C21D 1/78* (2013.01); *C22C 38/02* (2013.01);
(Continued)

(58) Field of Classification Search
None
See application file for complete search history.

(56) References Cited

U.S. PATENT DOCUMENTS 6,372,056 B1 4/2002 Kuroda et al.
2005/0040141 A1 2/2005 Ly
(Continued)

FOREIGN PATENT DOCUMENTS

JP S59-194621 U 12/1984
JP H01-289021 A 11/1989
(Continued)

OTHER PUBLICATIONS

Prater Industries, "Hardness of Materials" and "Comparision of Hardness Values", accessed at praterindustries.com on Dec. 1, 2021. [Cited in counterpart U.S. Appl. No. 16/616,360 mailed Dec. 6, 2021.

(Continued)

*Primary Examiner* — Xiaobei Wang
(74) *Attorney, Agent, or Firm* — Baker Botts L.L.P.; Michael A. Sartori

(57) ABSTRACT

A copper-coated steel wire includes a core wire made of a steel and a coating layer made of copper or a copper alloy which covers an outer peripheral surface of the core wire. The coating layer includes an intermediate layer which is disposed in a region including the interface with the core wire and has a higher zinc concentration than a remaining region of the coating layer.

15 Claims, 6 Drawing Sheets

(51) Int. Cl.
    *C22C 38/02*     (2006.01)
    *C21D 1/78*     (2006.01)
    *C23C 2/38*     (2006.01)
    *C23C 28/02*     (2006.01)

(52) U.S. Cl.
    CPC .............. *C23C 2/38* (2013.01); *C23C 28/021*
    (2013.01); *B32B 2255/06* (2013.01); *B32B 2255/205* (2013.01); *B32B 2311/12* (2013.01); *B32B 2311/30* (2013.01); *C21D 2211/009* (2013.01); *Y10T 428/12917* (2015.01)

(56) References Cited

U.S. PATENT DOCUMENTS

| | | | |
|---|---|---|---|
| 2015/0360309 A1* | 12/2015 | Sugimura | C22C 18/02 219/69.15 |
| 2018/0079927 A1 | 3/2018 | Yoshimoto et al. | |
| 2019/0154096 A1 | 5/2019 | Izumida | |

FOREIGN PATENT DOCUMENTS

| | | | | |
|---|---|---|---|---|
| JP | H08-337844 | A | | 12/1996 |
| JP | H11-256274 | A | | 9/1999 |
| JP | 2002-270039 | A | | 9/2002 |
| JP | 2006-096991 | A | | 4/2006 |
| JP | 2016-194070 | A | | 11/2016 |
| JP | 2017128746 | A | * | 7/2017 |
| JP | 2017-218659 | A | | 12/2017 |
| WO | 2015/033896 | A1 | | 3/2015 |
| WO | WO-2018233986 | A1 | * | 12/2018 ............. C23C 10/60 |

OTHER PUBLICATIONS

Office Action issued in U.S. Appl. No. 16/616,360 dated May 2, 2022.

* cited by examiner

COPPER-COATED STEEL WIRE AND STRANDED WIRE

TECHNICAL FIELD

The present disclosure relates to a copper-coated steel wire and a stranded wire.

BACKGROUND ART

A steel wire for a canted coil spring, which is a copper-coated steel wire including a core wire made of a steel and a plating layer made of copper or a copper alloy and covering an outer peripheral surface of the core wire, has been proposed (see, for example, Japanese Patent Application Laid-Open No. 2017-218659 (Patent Literature 1)).

CITATION LIST

Patent Literature

Patent Literature 1: Japanese Patent Application Laid-Open No. 2017-218659

SUMMARY OF INVENTION

A copper-coated steel wire according to the present disclosure includes a core wire made of a steel and a coating layer made of copper or a copper alloy and covering an outer peripheral surface of the core wire. The coating layer includes an intermediate layer disposed in a region including an interface with the core wire, the intermediate layer having a higher zinc concentration than a remaining region of the coating layer.

DESCRIPTION OF EMBODIMENTS

Figure 1:
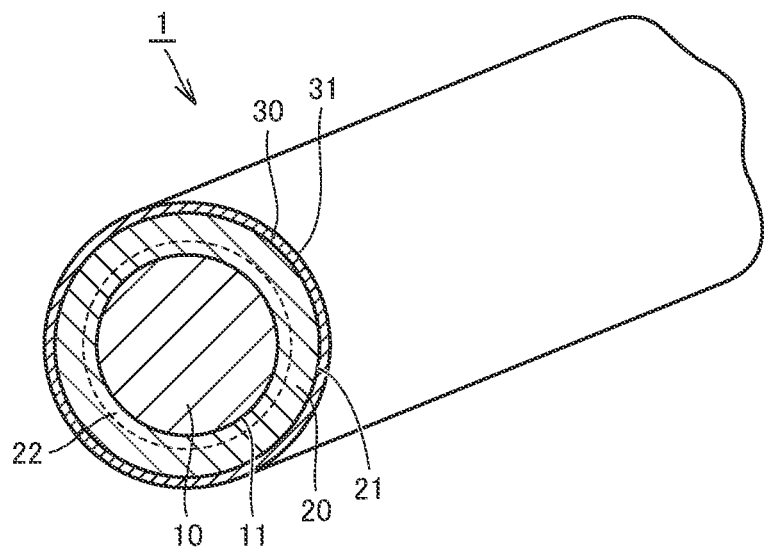
FIG. 1 is a schematic view showing the structure of a copper-coated steel wire.

Problem to be Solved by the Present Disclosure

A copper-coated steel wire including a core wire made of a steel and a coating layer made of copper or a copper alloy and covering an outer peripheral surface of the core wire can be used as an electric wire. For the electric wire, both strength and conductivity are required. In the copper-coated steel wire described above, the core wire made of a steel ensures high strength. The coating layer made of copper or a copper alloy ensures excellent conductivity. It is also required that the electric wire can be crimped for the purpose of simple connection. Crimping becomes easier when the region including the outer peripheral surface of the electric wire is more easily deformed. In the copper-coated steel wire described above, the coating layer made of copper or a copper alloy having a lower hardness than the steel contributes to the ease of crimping.

Connecting the copper-coated steel wire by crimping, however, may cause separation between the core wire and the coating layer. Thus, one of the objects is to provide a copper-coated steel wire which is capable of suppressing the separation between the core wire and the coating layer when crimping is conducted.

Advantageous Effects of the Present Disclosure

The copper-coated steel wire according to the present disclosure can improve the adhesion between the core wire and the coating layer.

DESCRIPTION OF EMBODIMENTS OF THE PRESENT INVENTION

Firstly, embodiments of the present invention will be listed and described. A copper-coated steel wire of the present application includes a core wire made of a steel and a coating layer made of copper or a copper alloy which covers an outer peripheral surface of the core wire. The coating layer includes an intermediate layer which is disposed in a region including an interface with the core wire and has a higher zinc concentration than a remaining region of the coating layer.

The present inventors investigated the way of improving the adhesion between the core wire and the coating layer. As a result, they have found that forming a layer in a region of the coating layer including the interface with the core wire to have a higher zinc concentration than the other regions in the coating layer improves the adhesion between the core wire and the coating layer. In the copper-coated steel wire of the present application, the coating layer includes the intermediate layer which is disposed in a region including the interface with the core wire and has a higher zinc concentration than a remaining region of the coating layer. Accordingly, the copper-coated steel wire of the present application improves the adhesion between the core wire and the coating layer and suppresses separation between the core wire and the coating layer when crimping is conducted.

In the copper-coated steel wire described above, a maximum zinc concentration in the intermediate layer may be not less than 0.5 at % and not more than 10 at %.

As explained above, the intermediate layer has the function of improving the adhesion between the core wire and the coating layer. Setting the maximum zinc concentration in the intermediate layer to be 0.5 at % or more improves the adhesion more reliably. It is thus preferable that the maximum zinc concentration in the intermediate layer is not less than 0.5 at %. On the other hand, the maximum zinc concentration in the intermediate layer exceeding 10 at % may decrease the conductivity of the copper-coated steel wire. It is thus preferable that the maximum zinc concentration in the intermediate layer is not more than 10 at %. For more reliably improving the adhesion, the maximum zinc concentration in the intermediate layer is preferably not less than 1 at %. For further suppressing the decrease in conductivity of the copper-coated steel wire, the maximum zinc concentration in the intermediate layer is preferably not more than 8 at %, and further preferably not more than 5 at %.

It should be noted that the maximum zinc concentration in the intermediate layer can be confirmed for example in the following manner. The copper-coated steel wire is firstly cut in a cross section perpendicular to the longitudinal direction thereof. The obtained cross section of the copper-coated steel wire is subjected to line analysis using Auger electron spectroscopy in a direction perpendicular to the interface between the core wire and the coating layer, to thereby measure the zinc concentration distribution in the coating layer. The measurement is conducted for five locations, and the maximum value of zinc concentration obtained is determined to be the maximum zinc concentration in the intermediate layer.

In the copper-coated steel wire described above, the adhesion strength between the core wire and the coating layer may be not less than 50 MPa. This configuration more reliably suppresses the separation between the core wire and the coating layer when crimping is conducted.

It should be noted that the adhesion strength between the core wire and the coating layer can be measured for example in the following manner. A plurality of notches are formed from a surface of the copper-coated steel wire in the radial direction to penetrate the coating layer. Each slit is formed to continue over the entire circumference. The intervals between the notches in the longitudinal direction of the copper-coated steel wire may be 2 mm, for example. Next, a copper wire is connected, by soldering, to a region sandwiched between the notches on the outer peripheral surface of the copper-coated steel wire. The copper wire may have a diameter of 0.9 mm, for example. Thereafter, a tensile tester is used to pull the copper wire to apply tensile stress in the radial direction of the copper-coated steel wire, and a stress that causes separation between the core wire and the coating layer is measured. The tensile speed may be 1 mm/min., for example.

In the copper-coated steel wire described above, the steel may have a pearlite structure. A steel having the pearlite structure is suitable as a material constituting the core wire of the copper-coated steel wire of the present application.

In the copper-coated steel wire described above, the steel may have a carbon content of not less than 0.3 mass % and not more than 1.1 mass %. The carbon content greatly affects the strength of the steel. Setting the carbon content within the above range makes it readily possible to impart appropriate strength to the core wire.

In the copper-coated steel wire described above, the steel may contain not less than 0.5 mass % and not more than 1.0 mass % carbon, not less than 0.1 mass % and not more than 2.5 mass % silicon, and not less than 0.3 mass % and not more than 0.9 mass % manganese, with the balance consisting of iron and unavoidable impurities.

In the copper-coated steel wire described above, the steel may further contain at least one element selected from the group consisting of: not less than 0.1 mass % and not more than 0.4 mass % nickel, not less than 0.1 mass % and not more than 1.8 mass % chromium, not less than 0.1 mass % and not more than 0.4 mass % molybdenum, and not less than 0.05 mass % and not more than 0.3 mass % vanadium.

The reasons why the component composition of the steel constituting the core wire is preferably within the above-described ranges will be described below.

Carbon (C): Not Less than 0.5 Mass % and not More than 1.0 Mass %

Carbon is an element that greatly affects the strength of the steel. For achieving sufficient strength as the core wire of the copper-coated steel wire, the carbon content is preferably not less than 0.5 mass %. On the other hand, an increased carbon content may reduce toughness, making working difficult. For ensuring sufficient toughness, the carbon content is preferably not more than 1.0 mass %. For further improving the strength, the carbon content is more preferably not less than 0.6 mass %, and further preferably not less than 0.8 mass %. For improving the toughness and facilitating the working, the carbon content is more preferably not more than 0.95 mass %.

Silicon (Si): Not Less than 0.1 Mass % and not More than 2.5 Mass %

Silicon is an element added as a deoxidizing agent in steel refining. To achieve the function as the deoxidizing agent, the silicon content is preferably not less than 0.1 mass %, and more preferably not less than 0.12 mass %. Further, silicon functions as a carbide-forming element in the steel, and has a property (resistance to softening) that suppresses softening due to heating. For suppressing softening due to heating at the time of producing the copper-coated steel wire as well as at the time of using the same, the silicon content is preferably not less than 0.8 mass %, and it may be not less than 1.8 mass %. On the other hand, silicon added in an excessive amount will reduce toughness. For ensuring sufficient toughness, the silicon content is preferably not more than 2.5 mass %, more preferably not more than 2.3 mass %, and it may even be not more than 2.2 mass %. From the standpoint of focusing on the toughness, the silicon content may be not more than 1.0 mass %.

Manganese (Mn): Not Less than 0.3 Mass % and not More than 0.9 Mass %

Manganese, as with silicon, is an element added as a deoxidizing agent in steel refining. To achieve the function as the deoxidizing agent, the manganese content is preferably not less than 0.3 mass %. On the other hand, manganese added in an excessive amount will reduce toughness and degrade workability in hot working. Therefore, the manganese content is preferably not more than 0.9 mass %.

Unavoidable Impurities

During the process of producing the core wire, phosphorus (P) and sulfur (S) are inevitably mixed into the steel constituting the core wire. Phosphorus and sulfur contained in an excessive amount will cause grain boundary segregation and produce inclusions, thereby deteriorating the properties of the steel. Therefore, the phosphorus content and sulfur content are each preferably not more than 0.025 mass %. The total content of the unavoidable impurities is preferably not more than 0.3 mass %.

Nickel (Ni): Not Less than 0.1 Mass % and not More than 0.4 Mass %

The addition of nickel suppresses the occurrence of a break during the wire drawing process of the core wire. For ensuring that this function is accomplished, nickel may be added in an amount of not less than 0.1 mass %. On the other hand, the above effect will be saturated even if nickel is added exceeding 0.4 mass %. Further, nickel, which is an expensive element, added in an amount exceeding 0.4 mass % will increase the production cost of the core wire. Therefore, the amount of nickel added is preferably not more than 0.4 mass %.

Chromium (Cr): not less than 0.1 mass % and not more than 1.8 mass % Chromium functions as a carbide-forming element in the steel, and, as a result of the generation of fine carbides, it contributes to the refinement of the metal structure and the suppression of softening during heating. For ensuring that such effects are achieved, chromium may be added in an amount of not less than 0.1 mass %, or not less than 0.2 mass %, or even not less than 0.5 mass %. On the other hand, chromium added in an excessive amount will lead to reduction in toughness. Thus, chromium is preferably added in an amount of not more than 1.8 mass %. The above-described effects by the addition of chromium are particularly prominent in the co-existence with silicon and vanadium. Thus, chromium is preferably added together with these elements.

Molybdenum (Mo): Not Less than 0.1 Mass % and not More than 0.4 Mass %

The addition of molybdenum improves the strength of the steel. For ensuring that this function is accomplished, molybdenum may be added in an amount of not less than 0.1 mass %. On the other hand, the above effect will be saturated even if molybdenum is added exceeding 0.4 mass %. Further, molybdenum, which is an expensive element, added in an amount exceeding 0.4 mass % will increase the production cost of the core wire. Therefore, the amount of molybdenum added is preferably not more than 0.4 mass %.

Vanadium (V): Not Less than 0.05 Mass % and not More than 0.3 Mass %

Vanadium functions as a carbide-forming element in the steel, and, as a result of the generation of fine carbides, it contributes to the refinement of the metal structure and the suppression of softening during heating. For ensuring that such effects are achieved, vanadium may be added in an amount of not less than 0.05 mass %. On the other hand, vanadium added in an excessive amount will reduce toughness. For ensuring sufficient toughness, the amount of vanadium added is preferably not more than 0.3 mass %. The above-described effects by the addition of vanadium are particularly prominent in the co-existence with silicon and chromium. Thus, vanadium is preferably added together with these elements.

The copper-coated steel wire described above may have a tensile strength of not less than 950 MPa and not more than 3000 MPa. Setting the tensile strength to be 950 MPa or more makes it readily possible to obtain sufficient strength as the copper-coated steel wire, particularly as the copper-coated steel wire used as an electric wire. Setting the tensile strength to be 3000 MPa or less makes it readily possible to ensure sufficient toughness. The tensile strength of the copper-coated steel wire is preferably not less than 1500 MPa. The tensile strength of the copper-coated steel wire is preferably not more than 2500 MPa.

In the copper-coated steel wire described above, the coating layer may have a hardness of not less than 50 HV and not more than 200 HV. Setting the hardness of the coating layer to be 50 HV or more makes it readily possible to impart sufficient strength to the coating layer. Setting the hardness of the coating layer to be 200 HV or less makes it readily possible to impart sufficient deformability to the coating layer, and readily possible to obtain a copper-coated steel wire appropriate to the connection by crimping.

The copper-coated steel wire described above may have a wire diameter of not less than 0.01 mm and not more than 1 mm. This configuration makes it readily possible to obtain the copper-coated steel wire particularly appropriate to the use as an electric wire. As used herein, the "wire diameter" means a diameter of the circular shape of the cross section of the copper-coated steel wire perpendicular to the longitudinal direction thereof. In the case of the steel wire having a cross section other than the circular shape, it means a diameter of the circle circumscribing the cross section.

The copper-coated steel wire described above may have an electrical conductivity of not less than 20% IACS (International Annealed Copper Standard) and not more than 80% IACS. This configuration makes it readily possible to obtain the copper-coated steel wire particularly appropriate to the use as an electric wire.

In the copper-coated steel wire described above, the core wire may have a diffusible hydrogen concentration of not more than 2.0 ppm. This configuration suppresses damages to the core wire attributable to hydrogen embrittlement.

The copper-coated steel wire described above may further include a surface layer which is disposed to include a surface and is made of at least one metal selected from the group consisting of gold (Au), silver (Ag), tin (Sn), palladium (Pd), and nickel (Ni). Such a surface layer may be formed for improving the wear resistance, reducing the contact resistance when the copper-coated steel wire is connected to a terminal or the like, or other purposes.

A stranded wire of the present application has a plurality of the above-described copper-coated steel wires of the present application twisted together. The stranded wire of the present application, having the structure in which the copper-coated steel wires of the present application are twisted together, provides a stranded wire which not only has high adhesion between the core wire and the coating layer, but also is excellent in flexibility.

DETAILS OF EMBODIMENTS OF THE PRESENT INVENTION

Embodiments of the copper-coated steel wire and the stranded wire according to the present disclosure will be described below with reference to the drawings. In the following drawings, the same or corresponding parts are denoted by the same reference numerals, and the description thereof will not be repeated.

Embodiment 1

Figure 2:
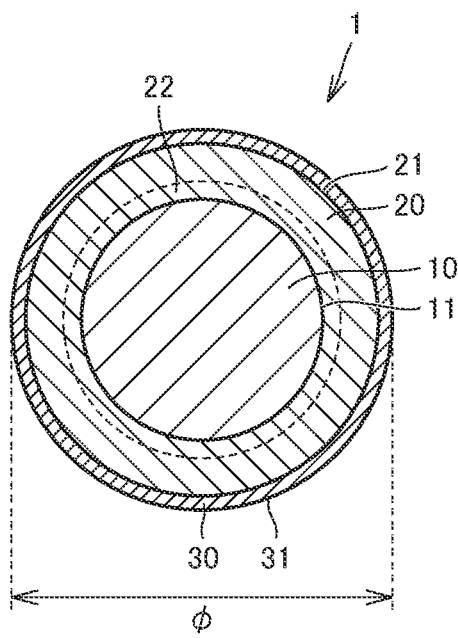
FIG. 2 is a schematic cross-sectional view showing the structure of the copper-coated steel wire.

FIG. 1 is a schematic view showing the structure of a copper-coated steel wire. FIG. 2 is a schematic cross-sectional view showing the structure of the copper-coated steel wire. FIG. 2 shows a cross section in a plane perpendicular to the longitudinal direction of the copper-coated steel wire.

Referring to FIGS. 1 and 2, the copper-coated steel wire 1 in the present embodiment includes a core wire 10 made of a steel, a coating layer 20 made of copper or a copper alloy and covering an outer peripheral surface 11 of the core wire 10, and a surface layer 30 made of at least one metal selected from the group consisting of gold, silver, tin, palladium, and nickel, and disposed to include a surface 31 (outer peripheral surface).

The core wire 10 has a cross section of a circular shape perpendicular to the longitudinal direction thereof. The steel constituting the core wire 10 has a pearlite structure, for example. The steel constituting the core wire 10 preferably has a carbon content of not less than 0.3 mass % and not more than 1.1 mass %. The steel constituting the core wire 10 may contain not less than 0.5 mass % and not more than 1.0 mass % carbon, not less than 0.1 mass % and not more than 2.5 mass % silicon, and not less than 0.3 mass % and not more than 0.9 mass % manganese, with the balance consisting of iron and unavoidable impurities. The steel constituting the core wire 10 may further contain at least one element selected from the group consisting of: not less than 0.1 mass % and not more than 0.4 mass % nickel, not less than 0.1 mass % and not more than 1.8 mass % chromium, not less than 0.1 mass % and not more than 0.4 mass % molybdenum, and not less than 0.05 mass % and not more than 0.3 mass % vanadium. The core wire 10 may be, for example, a piano wire defined in the Japanese Industrial Standard (JIS), specifically SWP-B. The core wire 10 preferably has a diffusible hydrogen concentration of not more than 2.0 ppm.

The coating layer 20 covers the outer peripheral surface 11 of the core wire 10 over the entire circumference. The coating layer 20 is disposed in contact with the outer peripheral surface 11 of the core wire 10. The coating layer 20 is a plating layer, such as a copper plating layer. The coating layer 20 is a layer formed by the plating process, for example. In the present embodiment, the coating layer 20 is made of pure copper (consisting of copper and unavoidable impurities). The coating layer 20 has a hardness of not less than 50 HV and not more than 200 HV, for example.

The coating layer 20 includes an intermediate layer 22 which is disposed in a region including the interface with the core wire 10 and has a higher zinc (Zn) concentration than a remaining region of the coating layer 20. The intermediate layer 22 is disposed to surround the outer peripheral surface 11 of the core wire 10 over the entire circumference. The intermediate layer 22 is disposed to contact the outer peripheral surface 11 of the core wire 10 over the entire circumference. The intermediate layer 22 has a maximum zinc concentration of not less than 0.5 at % and not more than 10 at %, for example.

The surface layer 30 covers an outer peripheral surface 21 of the coating layer 20 over the entire circumference. The surface layer 30 is disposed in contact with the outer peripheral surface 21 of the coating layer 20. The surface layer 30 is disposed to surround the outer peripheral surface 21 of the coating layer 20 over the entire circumference. The surface layer 30 is disposed to contact the outer peripheral surface 21 of the coating layer 20 over the entire circumference. The surface layer 30 has its outer peripheral surface constituting the surface 31 (outer peripheral surface) of the copper-coated steel wire 1.

In the copper-coated steel wire 1 of the present embodiment, the coating layer 20 includes the intermediate layer 22 which is disposed in the region including the interface with the core wire 10 and has a higher zinc concentration than the remaining region of the coating layer 20. As a result, the copper-coated steel wire 1 of the present embodiment is a copper-coated steel wire which is improved in adhesion between the core wire 10 and the coating layer 20 and is capable of suppressing the separation between the core wire 10 and the coating layer 20 when crimping is conducted.

In the copper-coated steel wire 1 of the present embodiment, the adhesion strength between the core wire 10 and the coating layer 20 is preferably not less than 50 MPa. This configuration further reliably suppresses the separation between the core wire 10 and the coating layer 20 when crimping is conducted.

The copper-coated steel wire 1 of the present embodiment preferably has a tensile strength of not less than 950 MPa and not more than 3000 MPa. Setting the tensile strength to be 950 MPa or more makes it readily possible to obtain sufficient strength as the copper-coated steel wire, particularly as the copper-coated steel wire used as an electric wire. Setting the tensile strength to be 3000 MPa or less makes it readily possible to ensure sufficient toughness.

The copper-coated steel wire 1 of the present embodiment preferably has a wire diameter ϕ, of not less than 0.01 mm and not more than 1 mm. This configuration makes it readily possible to obtain the copper-coated steel wire particularly appropriate to the use as an electric wire.

The copper-coated steel wire 1 of the present embodiment preferably has an electrical conductivity of not less than 20% IACS and not more than 80% IACS. This configuration makes it readily possible to obtain the copper-coated steel wire particularly appropriate to the use as an electric wire.

Figure 3:
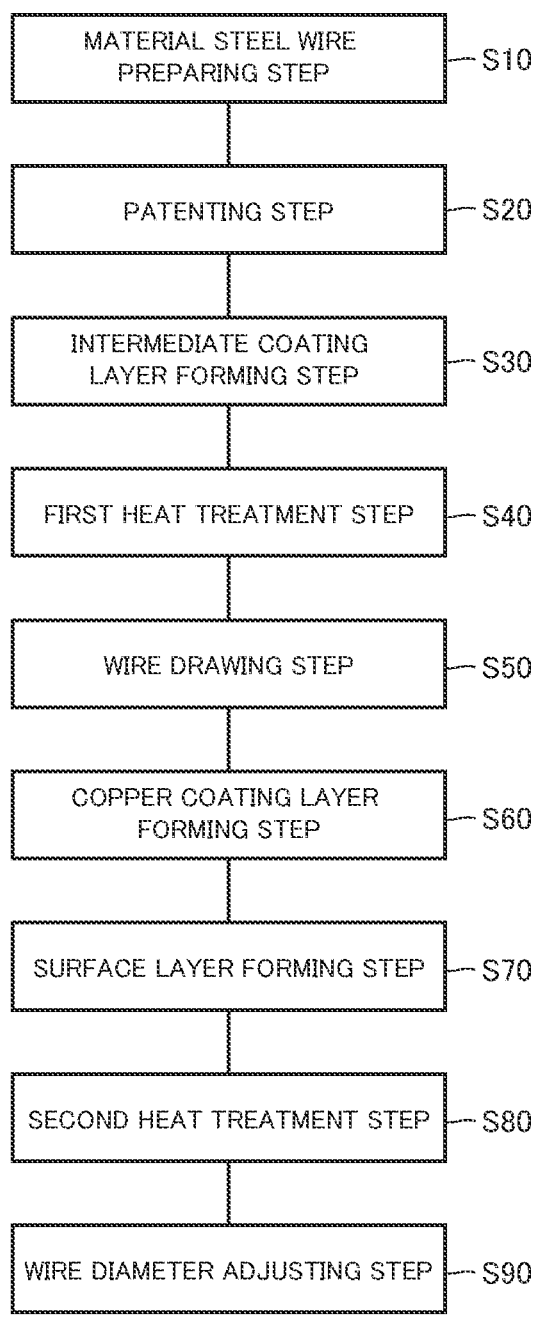
FIG. 3 is a flowchart schematically illustrating a method of producing a copper-coated steel wire.
Figure 4:
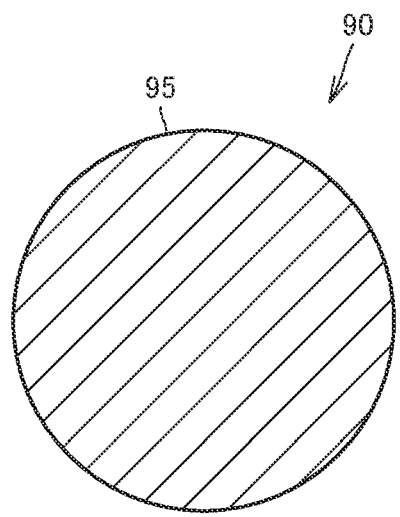
FIG. 4 is a schematic cross-sectional view showing the structure of a material steel wire.
Figure 5:
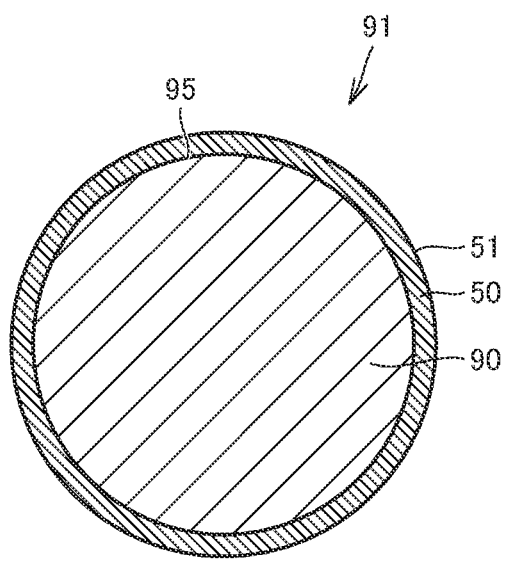
FIG. 5 is a schematic cross-sectional view showing the structure of the material steel wire having an intermediate coating layer formed thereon.
Figure 6:
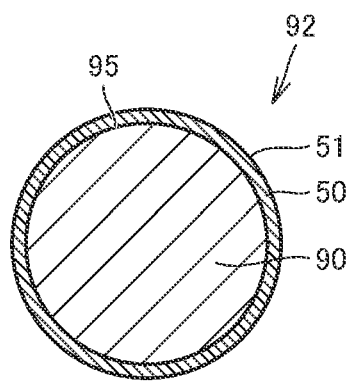
FIG. 6 is a schematic cross-sectional view illustrating a wire drawing process.
Figure 7:
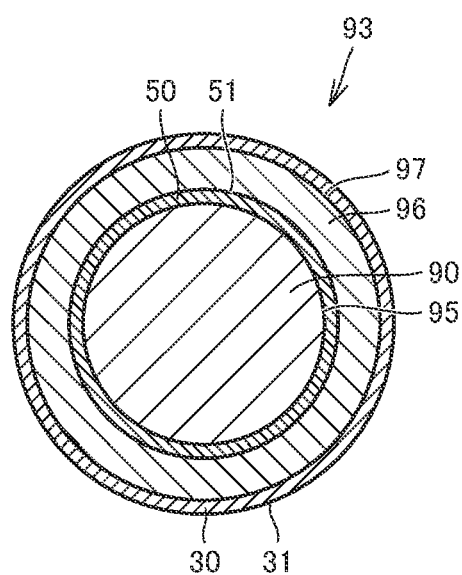
FIG. 7 is a schematic cross-sectional view showing the structure of the material steel wire having the intermediate coating layer, a copper coating layer, and a surface layer formed thereon.
Figure 8:
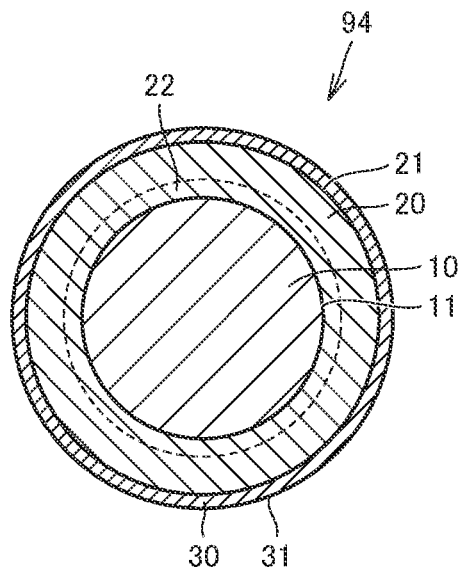
FIG. 8 is a schematic cross-sectional view illustrating a second heat treatment step.

An exemplary method of producing the copper-coated steel wire 1 will now be described with reference to FIGS. 1 to 8. Referring to FIG. 3, in the method of producing the copper-coated steel wire 1 of the present embodiment, a material steel wire preparing step is firstly performed as a step S10. In the step S10, referring to FIG. 4, a material steel wire 90 to be the core wire 10 is prepared. Specifically, the material steel wire 90 is prepared which is made of a steel containing, for example, not less than 0.5 mass % and not more than 1.0 mass % carbon, not less than 0.1 mass % and not more than 2.5 mass % silicon, and not less than 0.3 mass % and not more than 0.9 mass % manganese, with the balance consisting of iron and unavoidable impurities. The steel constituting the material steel wire 90 may further contain at least one element selected from the group consisting of: not less than 0.1 mass % and not more than 0.4 mass % nickel, not less than 0.1 mass % and not more than 1.8 mass % chromium, not less than 0.1 mass % and not more than 0.4 mass % molybdenum, and not less than 0.05 mass % and not more than 0.3 mass % vanadium.

Next, referring to FIG. 3, a patenting step is performed as a step S20. In the step S20, referring to FIG. 4, the material steel wire 90 prepared in the step S10 is subjected to patenting. Specifically, heat treatment is conducted in which the material steel wire 90 is heated to a temperature range not lower than the austenitizing temperature ($A_1$ point) and then rapidly cooled to a temperature range higher than the martensitic transformation start temperature ($M_s$ point) and held in the temperature range. With this, the metal structure of the material steel wire 90 attains a fine pearlite structure with small lamellar spacing. Here, in the patenting treatment, the process of heating the material steel wire 90 to the temperature range not lower than the $A_1$ point is preferably performed in an inert gas atmosphere from the standpoint of suppressing the occurrence of decarburization.

Next, referring to FIG. 3, an intermediate coating layer forming step is performed as a step S30. In the step S30, referring to FIGS. 4 and 5, an intermediate coating layer 50 containing copper and zinc is formed to cover an outer peripheral surface 95 of the material steel wire 90 that has undergone the patenting treatment in the step S20. Specifically, for example, the intermediate coating layer 50, which is a metal layer containing copper and zinc, is formed by plating on the outer peripheral surface 95 of the material steel wire 90. The intermediate coating layer 50 contains, for example, not less than 25 mass % and not more than 50 mass % zinc, with the balance consisting of copper and unavoidable impurities. The unavoidable impurities are preferably not more than 1 mass %, for example, and preferably 0.5 mass % or less. The zinc content in the intermediate coating layer 50 is more preferably not less than 36 mass % and not more than 42 mass %. With this step S30 conducted, a first intermediate steel wire 91 is obtained. While a description was made in the present embodiment about the case of forming the intermediate coating layer 50 containing copper and zinc, an intermediate coating layer 50 containing zinc but not containing copper may be formed.

Next, referring to FIG. 3, a first heat treatment step is performed as a step S40. In the step S40, referring to FIG. 5, the first intermediate steel wire 91 obtained through the process up to the step S30 is subjected to heat treatment. Specifically, the first intermediate steel wire 91 is heated to a temperature not lower than the melting point of zinc (419.5° C.). With this, zinc and copper constituting the intermediate coating layer 50 formed in the step S30 becomes a uniform alloy. The heating temperature in the step S40 is preferably not lower than 550° C. The heating temperature in the step S40 is preferably not higher than 650° C. The heating time in the step S40 can be, for example, not shorter than 3 seconds and not longer than 7 seconds.

Next, referring to FIG. 3, a wire drawing step is performed as a step S50. In the step S50, referring to FIGS. 5 and 6, the first intermediate steel wire 91 having undergone the heat treatment in the step S40 is subjected to a wire drawing process (drawing process). The degree of working (reduction of area) in the wire drawing process in the step S50 can be, for example, not less than 90% and not more than 99%. A true strain in the wire drawing process in the step S50 is preferably, for example, not less than 2.3 and not more than 3.9. The above procedure yields a second intermediate steel wire 92.

Next, referring to FIG. 3, a copper coating layer forming step is performed as a step S60. In the step S60, referring to FIGS. 6 and 7, a copper coating layer 96 is formed to cover an entire circumference of an outer peripheral surface 51 of the intermediate coating layer 50 of the second intermediate steel wire 92 obtained through the process up to the step S50. The copper coating layer 96 is formed to contact the outer peripheral surface 51 of the intermediate coating layer 50. The copper coating layer 96 can be formed by plating, for example. The copper coating layer 96 is made of pure copper, for example.

Next, referring to FIG. 3, a surface layer forming step is performed as a step S70. In the step S70, referring to FIG. 7, a surface layer 30 is formed to cover an entire circumference of an outer peripheral surface 97 of the copper coating layer 96 formed in the step S60. The surface layer 30 is formed to contact the outer peripheral surface 97 of the copper coating layer 96. The surface layer 30 can be formed by plating, for example. The surface layer 30 is made of at least one metal selected from the group consisting of gold, silver, tin, palladium, and nickel. The above procedure yields a third intermediate steel wire 93.

Next, referring to FIG. 3, a second heat treatment step is performed as a step S80. In the step S80, referring to FIGS. 7 and 8, the third intermediate steel wire 93 obtained through the process up to the step S70 is subjected to heat treatment. Specifically, the third intermediate steel wire 93 is heated to a temperature not lower than the recrystallization temperature of copper. The heating temperature in the step S80 is preferably not lower than 100° C. The heating temperature in the step S80 is preferably not higher than 400° C. The heating time in the step S80 can be, for example, not shorter than 5 minutes and not longer than 3 hours. This causes copper constituting the copper coating layer 96 to recrystallize. This also causes the intermediate coating layer 50 and the copper coating layer 96 to be integrated to form the coating layer 20. The material steel wire 90 becomes the core wire 10. At this time, zinc contained in the intermediate coating layer 50 diffuses into the copper coating layer 96. As a result, in a region in the coating layer 20 including the interface with the core wire 10, the intermediate layer 22 is formed which has a higher zinc concentration than the remaining region of the coating layer 20. The above procedure yields a fourth intermediate steel wire 94.

Next, referring to FIG. 3, a wire diameter adjusting step is performed as a step S90. In the step S90, referring to FIG. 8 and FIGS. 1 and 2, the fourth intermediate steel wire 94 having undergone the heat treatment in the step S80 is subjected to a wire drawing process (drawing process) with a low working degree. The degree of working (reduction of area) in the wire drawing process in the step S90 can be, for example, not less than 1% and not more than 20%. Through the above-described procedure, the copper-coated steel wire 1 according to the present embodiment can be produced with ease. In the method of producing the copper-coated steel wire 1 of the present embodiment, prior to the wire drawing process in the step S50 to be performed with a high working degree, the intermediate coating layer 50 containing zinc is formed in the step S30. This facilitates the wire drawing process with the high working degree in the step S50. Further, in the method of producing the copper-coated steel wire 1 of the present embodiment, prior to the formation (plating process) of the copper coating layer 96 in the step S60, the intermediate coating layer 50 containing zinc is formed. This suppresses the penetration of hydrogen into the material steel wire 90 (the core wire 10) in the step S60. Further, in the method of producing the copper-coated steel wire 1 of the present embodiment, the copper coating layer 96 is formed after the wire drawing process with the high working degree has been performed in the step S50. This eliminates the need to perform the wire drawing process with a high working degree on the steel wire having the copper coating layer 96 formed thereon, thereby enabling stable production of the copper-coated steel wire 1.

Embodiment 2

Figure 9:
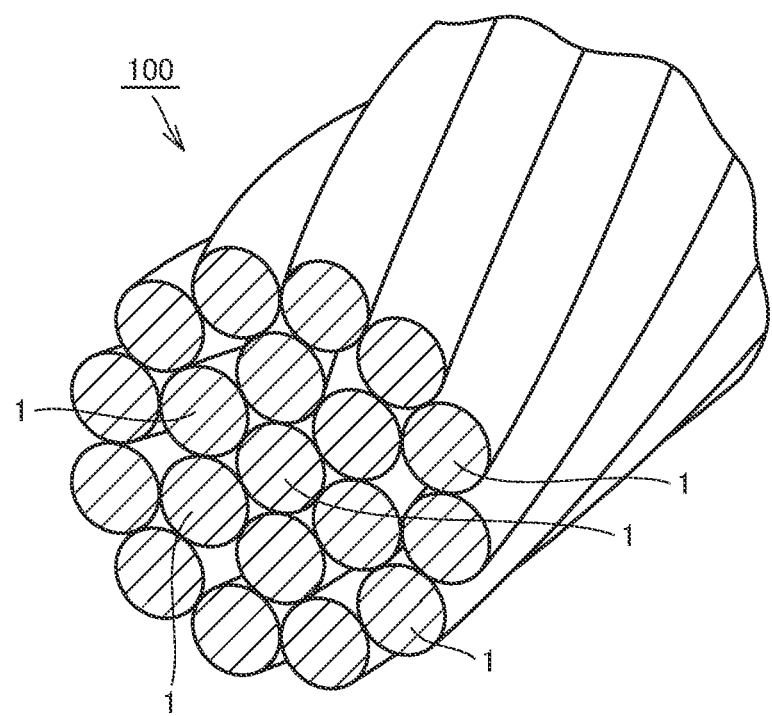
FIG. 9 is a schematic view showing the structure of a stranded wire.

An embodiment of the stranded wire of the present application will be described below as Embodiment 2. Referring to FIG. 9, the stranded wire 100 in the present embodiment is constructed with a plurality of the above-described copper-coated steel wires 1 of Embodiment 1 twisted together. In the present embodiment, the stranded wire has a structure in which 19 copper-coated steel wires 1 have been twisted together. Each copper-coated steel wire 1 included in the stranded wire 100 is the copper-coated steel wire of Embodiment 1 described above. The stranded wire 100, having the structure with the copper-coated steel wires 1 of Embodiment 1 above twisted together, not only has high adhesion between the core wire 10 and the coating layer 20, but also has excellent flexibility, so it is suitable as an electric wire.

The stranded wire 100 of the present embodiment can be produced by twisting together a plurality of copper-coated steel wires 1 produced by the production method described in Embodiment 1 above.

While the case of twisting 19 copper-coated steel wires 1 together has been described in the present embodiment, the number of copper-coated steel wires 1 constituting the stranded wire 100 is not particularly limited as long as it is more than one. For the stranded wire, any structure with an appropriate number of copper-coated steel wires 1 twisted together depending on its application and required properties can be selected.

EXAMPLES (Experiment 1)

Figure 10:
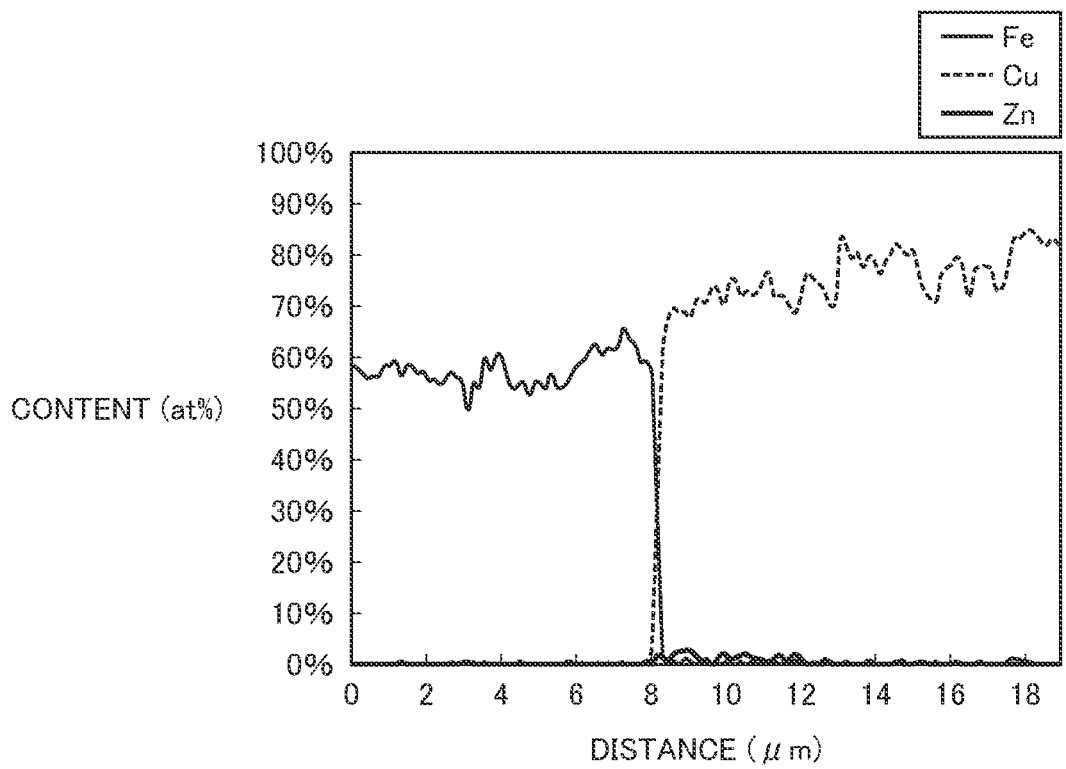
FIG. 10 shows results of line analysis in the vicinity of an interface between a core wire and a coating layer by Auger electron spectroscopy.
Figure 11:
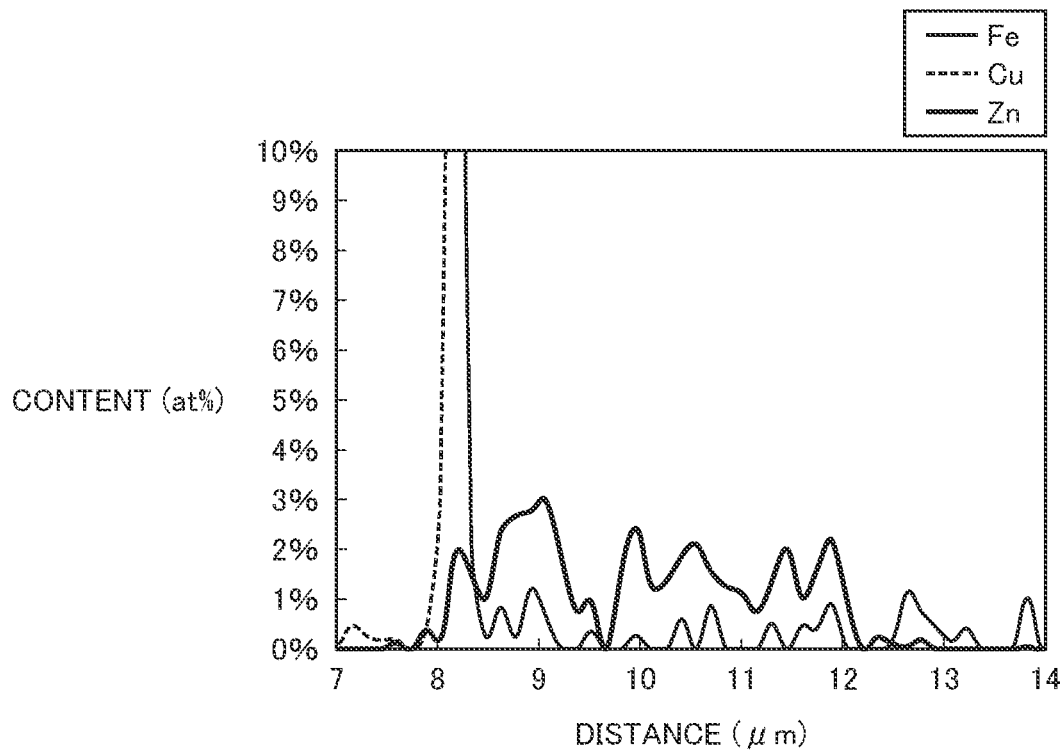
FIG. 11 is an enlarged view of a portion of FIG. 10.

An experiment was conducted to confirm the state of formation of the intermediate layer in the copper-coated steel wire of the present application. The experimental procedure was as follows. Firstly, the copper-coated steel wire 1 was produced by a process similar to the procedure in Embodiment 1 above, except that the step S70 was omitted. Next, the copper-coated steel wire 1 was cut along a cross section perpendicular to the longitudinal direction thereof. In the cross section, a line analysis was conducted using Auger electron spectroscopy to transverse the interface between the core wire 10 and the coating layer 20 in the direction perpendicular to the interface, to investigate the concentrations of iron, copper, and zinc in the vicinity of the interface. As the Auger electron spectrometer, PHI 700 (trade name) manufactured by ULVAC-PHI, Inc. was used. The measurement conditions were: 10 kV, 10 nA, no sample tilting, and sputtering at 1 kV. The experimental results are shown in FIGS. 10 and 11. In FIGS. 10 and 11, thin solid lines, broken lines, and bold solid lines correspond to iron, copper, and zinc, respectively. In FIGS. 10 and 11, the horizontal axis represents distance. In FIGS. 10 and 11, the vertical axis represents contents of the elements. In FIGS. 10 and 11, the area around where the value on the horizontal axis is 8 μm corresponds to the interface between the core wire 10 and the coating layer 20. FIG. 11 is an enlarged view showing the vicinity of the interface between the core wire 10 and the coating layer 20 in FIG. 10.

Referring to FIGS. 10 and 11, it is confirmed that the intermediate layer 22, having a higher zinc concentration than the other regions, has been formed on the coating layer 20 side of the interface between the core wire 10 and the coating layer 20. The maximum zinc concentration in the intermediate layer 22 is about 3 at %. The intermediate layer 22 has a thickness of about 4 μm. From the standpoint of allowing the intermediate layer to perform its functions as necessary and sufficiently, the thickness of the intermediate layer 22 is preferably not less than 1 μm and not more than 10 μm. The above experimental results demonstrate that the copper-coated steel wire 1 of Embodiment 1 including the intermediate layer 22 can be produced by the production method in Embodiment 1 above.

(Experiment 2)

An experiment was conducted to confirm the adhesion between the core wire and the coating layer and other properties of the copper-coated steel wire of the present application. The experimental procedure was as follows.

Firstly, the copper-coated steel wires 1 were produced by a process similar to the procedure in Embodiment 1 above, except that the step S70 was omitted. For the copper-coated steel wires 1, surface roughness, adhesion strength, minimum R/d, tensile strength, and tensile strength after crimping were measured (Samples A-H; Inventive Examples). Further, for a sample produced in a similar manner, diffusible hydrogen contents upon completion of the step S50 (Before Copper Coating) and upon completion of the step S60 (After Copper Coating) were measured (Process A; Inventive Example). For comparison, tensile strength and tensile strength after crimping were also measured for copper alloy wires, instead of the copper-coated steel wires. The copper alloys constituting the copper alloy wires were copper-silver alloys (Samples a and b; Comparative Examples), and copper-tin alloys (Samples c and d; Comparative Examples). For further comparison, samples were produced in a similar manner, except that the steps S30 and S40 for forming the intermediate layer 22 as well as the step S60 were omitted. For these samples, surface roughness, minimum R/d, tensile strength, and tensile strength after crimping were also measured (Samples e-h; Comparative Examples). Further, for a sample produced in a similar manner, diffusible hydrogen contents before and after copper coating were measured (Process B; Comparative Example).

For the surface roughness, arithmetic mean roughness Ra was measured. The surface roughness was evaluated on the basis of the ratio of the surface roughness Ra with respect to the thickness of the coating layer 20. The adhesion strength was measured in the following manner. A plurality of notches were formed from the surface of the copper-coated steel wire 1 in the radial direction to penetrate the coating layer 20. Each slit was formed to continue over the entire circumference. The interval between the notches in the longitudinal direction of the copper-coated steel wire 1 was set to be 2 mm. Next, a copper wire was connected by soldering to the region on the outer peripheral surface of the copper-coated steel wire 1 sandwiched between the notches. The copper wire diameter was set to be 0.9 mm. Thereafter, a tensile tester was used to pull the copper wire to apply tensile stress in the radial direction of the copper-coated steel wire 1, to measure a stress causing the separation between the core wire 10 and the coating layer 20. The tensile speed was set to be 1 mm/min., for example.

The minimum R/d is an index for evaluating to what radius of curvature the copper-coated steel wire can be bent without causing separation between the core wire and the coating layer. The durability of the copper-coated steel wire against bending was evaluated on the basis of a value (minimum R/d) obtained by dividing the radius of curvature, R, of the copper-coated steel wire at the time of occurrence of separation between the core wire and the coating layer by the radius d of the copper-coated steel wire. The tensile strength after crimping was evaluated by conducting a tensile test after crimping the copper-coated steel wire using a crimp terminal that applied a force to the copper-coated steel wire in the radially compressing direction. The tensile strength after crimping of not less than 600 MPa is practically preferable. The experimental results are shown in Tables 1 and 2, together with the wire diameter and other experimental conditions.

TABLE 1

| | Wire Diameter (mm) | Core Wire Diameter (mm) | Coating Layer Thickness (mm) | Surface Roughness Ra (%) | Adhesion Strength (MPa) | Minimum R/d | Tensile Strength (MPa) | Tensile Strength after Crimping (MPa) |
|---|---|---|---|---|---|---|---|---|
| A | 0.25 | 0.16 | 0.045 | 5 | 95 | <0.1 | 1580 | 1120 |
| B | 0.25 | 0.16 | 0.045 | 6 | 98 | | 1320 | 1175 |
| C | 0.25 | 0.16 | 0.045 | 9 | 100 | | 1365 | 1165 |
| D | 0.25 | 0.18 | 0.035 | 8 | 103 | | 1690 | 1220 |
| E | 0.25 | 0.18 | 0.035 | 10 | 110 | | 1625 | 1280 |

TABLE 1-continued

| | Wire Diameter (mm) | Core Wire Diameter (mm) | Coating Layer Thickness (mm) | Surface Roughness Ra (%) | Adhesion Strength (MPa) | Minimum R/d | Tensile Strength (MPa) | Tensile Strength after Crimping (MPa) |
|---|---|---|---|---|---|---|---|---|
| F | 0.25 | 0.18 | 0.035 | 11 | 112 | — | 1710 | 1265 |
| G | 0.5 | 0.35 | 0.075 | 8 | 104 | — | 1680 | 1215 |
| H | 0.5 | 0.35 | 0.075 | 13 | 110 | — | 1705 | 1230 |
| a | 0.25 | — | — | — | — | — | 840 | 510 |
| b | 0.5 | — | — | — | — | — | 810 | 480 |
| c | 0.25 | — | — | — | — | — | 795 | 460 |
| d | 0.5 | — | — | — | — | — | 800 | 450 |
| e | 0.25 | 0.16 | 0.045 | 32 | 35 | 0.3 | 1220 | 560 |
| f | 0.25 | 0.18 | 0.035 | 35 | 40 | 0.2 | 1580 | 580 |
| g | 0.5 | 0.35 | 0.075 | 33 | 25 | 0.4 | 1655 | 535 |
| h | 0.5 | 0.35 | 0.075 | 31 | 35 | 0.3 | 1690 | 565 |

TABLE 2

| | | Diffusible Hydrogen Content (ppm) |
|---|---|---|
| Process A | Before Copper Coating | 0.32 |
| | After Copper Coating | 0.32 |
| Process B | Before Copper Coating | 0.33 |
| | After Copper Coating | 2.65 |

Referring to Table 1, Samples A-H as the inventive examples are considerably higher in adhesion strength than Samples e-h as the comparative examples. In terms of the minimum R/d as well, Samples A-H are clearly superior to Samples e-h. It is thus confirmed that the copper-coated steel wire of the present application is a copper-coated steel wire in which separation between the core wire and the coating layer is suppressed by the provision of the intermediate layer 22. As to the tensile strength, Samples e-h, having the core wire made of a steel, have tensile strength higher than those of Samples a-d and comparable to those of Samples A-H. As to the tensile strength after crimping, however, the values of Samples e-h are close to those of Samples a-d. This is considered to be because crimping caused separation between the core wire and the coating layer. In contrast, Samples A-H as the copper-coated steel wires of the present application including the intermediate layer 22 are significantly superior to Samples e-h in terms of the tensile strength after crimping. This is considered to be because the presence of the intermediate layer 22 has led to an increased adhesion strength between the core wire 10 and the coating layer 20, thereby suppressing the separation between the core wire 10 and the coating layer 20.

Referring to Table 2, in Process A in which the copper-coated steel wire 1 of the inventive example was produced, the diffusible hydrogen content was maintained at a low level before and after the copper coating. In contrast, in Process B in which the copper-coated steel wire of the comparative example was produced, although the diffusible hydrogen content before the copper coating was low, the diffusible hydrogen content after the copper coating was high. This is considered to be because in Process A in which the copper-coated steel wire 1 of the inventive example was produced, prior to the formation (plating process) of the copper coating layer 96 in the step S60, the intermediate coating layer 50 containing zinc had been formed on the surface of the material steel wire 90 after the wire drawing, which has suppressed the penetration of hydrogen into the material steel wire 90 (the core wire 10).

The above-described experimental results demonstrate that the copper-coated steel wire of the present application provides a copper-coated steel wire which is capable of suppressing the separation between the core wire and the coating layer when crimping is conducted.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: copper-coated steel wire; 10: core wire; 11: outer peripheral surface; 20: coating layer; 21: outer peripheral surface; 22: intermediate layer; 30: surface layer; 31: surface; 50: intermediate coating layer; 51: outer peripheral surface; 90: material steel wire; 91: first intermediate steel wire; 92: second intermediate steel wire; 93: third intermediate steel wire; 94: fourth intermediate steel wire; 95: outer peripheral surface; 96: copper coating layer; 97: outer peripheral surface; and 100: stranded wire.

The invention claimed is:

1. A copper-coated steel wire comprising:
    a core wire made of a steel; and
    a coating layer made of copper or a copper alloy and covering an outer peripheral surface of the core wire,
    the coating layer including an intermediate layer disposed in a region including an interface with the core wire, the intermediate layer having a higher zinc concentration than a remaining region of the coating layer, wherein the intermediate layer has a maximum zinc concentration of not less than 0.5 at % and not more than 10 at %.

2. The copper-coated steel wire according to claim 1, wherein an adhesion strength between the core wire and the coating layer is not less than 50 MPa.

3. The copper-coated steel wire according to claim 1, wherein the steel has a pearlite structure.

4. The copper-coated steel wire according to claim 1, wherein the steel has a carbon content of not less than 0.3 mass % and not more than 1.1 mass %.

5. The copper-coated steel wire according to claim 4, wherein the steel contains not less than 0.5 mass % and not more than 1.0 mass % carbon, not less than 0.1 mass % and not more than 2.5 mass % silicon, not less than 0.3 mass % and not more than 0.9 mass % manganese, and a balance consisting of iron and unavoidable impurities.

6. The copper-coated steel wire according to claim 4, wherein the steel contains not less than 0.5 mass % and not more than 1.0 mass % carbon, not less than 0.1 mass % and not more than 2.5 mass % silicon, not less than 0.3 mass % and not more than 0.9 mass % manganese, and at least one element selected from the group consisting of: not less than 0.1 mass % and not more than 0.4 mass % nickel, not less than 0.1 mass % and not more than 1.8 mass % chromium, not less than 0.1 mass % and not more than 0.4 mass % molybdenum, not less than 0.05 mass % and not more than 0.3 mass % vanadium, and a balance consisting of iron and unavoidable impurities.

7. The copper-coated steel wire according to claim 1, having a tensile strength of not less than 950 MPa and not more than 3000 MPa.

8. The copper-coated steel wire according to claim 1, wherein the coating layer has a hardness of not less than 50 HV and not more than 200 HV.

9. The copper-coated steel wire according to claim 1, wherein the copper-coated steel wire has a diameter of not less than 0.01 mm and not more than 1 mm.

10. The copper-coated steel wire according to claim 1, having an electrical conductivity of not less than 20% IACS and not more than 80% IACS.

11. The copper-coated steel wire according to claim 1, wherein the core wire has a diffusible hydrogen concentration of not more than 2.0 ppm.

12. The copper-coated steel wire according to claim 1, further comprising a surface layer disposed to constitute a surface, the surface layer being made of at least one metal selected from the group consisting of gold, silver, tin, palladium, and nickel.

13. A stranded wire comprising a plurality of the copper-coated steel wires according to claim 1 twisted together.

14. A copper-coated steel wire comprising:
a core wire made of a steel;
a coating layer made of copper or a copper alloy and covering an outer peripheral surface of the core wire; and
a surface layer disposed to constitute a surface, the surface layer being made of at least one metal selected from the group consisting of gold, silver, tin, palladium, and nickel,
the coating layer including an intermediate layer disposed in a region including an interface with the core wire, the intermediate layer having a higher zinc concentration than a remaining region of the coating layer, wherein
the intermediate layer has a maximum zinc concentration of not less than 0.5 at % and not more than 10 at %,
an adhesion strength between the core wire and the coating layer is not less than 50 MPa,
the steel has a pearlite structure, and
the steel contains not less than 0.5 mass % and not more than 1.0 mass % carbon, not less than 0.1 mass % and not more than 2.5 mass % silicon, not less than 0.3 mass % and not more than 0.9 mass % manganese, and a balance consisting of iron and unavoidable impurities.

15. A stranded wire comprising a plurality of the copper-coated steel wires according to claim 14 twisted together.

* * * * *